July 29, 1969 E. J. MASSEY 3,458,164
CAN HOLDER
Filed Nov. 15, 1967
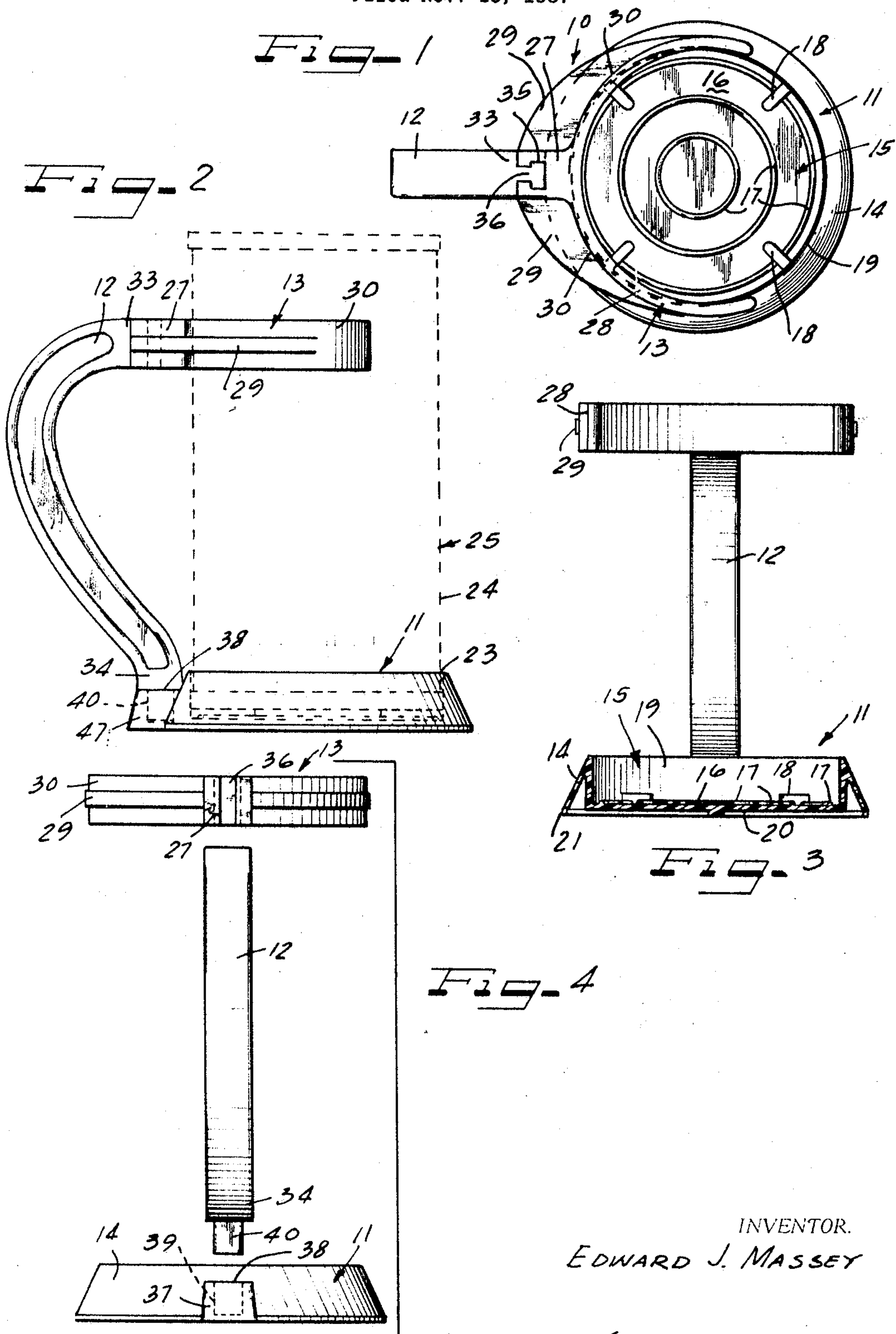
INVENTOR.
EDWARD J. MASSEY
BY Hill, Sherman, Meroni, Gross & Simpson ATTORNEYS

United States Patent Office 3,458,164 Patented July 29, 1969

3,458,164

CAN HOLDER

Edward J. Massey, Chicago, Ill., assignor of one-half to Richard Kehr, Chicago, Ill.

Filed Nov. 15, 1967, Ser. No. 683,191
Int. Cl. A47j *47/00*
U.S. Cl. 248—145.6 3 Claims

ABSTRACT OF THE DISCLOSURE

A plastic decorative holder for standard size beverage cans which has a coaster-like base supporting an arcuate handle upwardly bowed therefrom and terminating in a resilient can gripping member of greater than semi-circular extent but sized to permit the can to be snapped into engagement thereby and to be resiliently retained therein. A T-slot on the upper end of the handle cooperates with a T-groove in the holder member to retain said holder in position and a rectangular recess in the base member snugly cooperates with a four-sided projection on the bottom of the handle to receive the same and thereby securely attach the handle to the base.

BACKGROUND OF THE INVENTION

Field of the invention

This invention relates to a plastic handle and holder sized for use in connection with standard size beverage cans.

Prior art

It has been known in the prior art to manufacture articles for attaching handles to cylindrical objects such as cans, bottles, and glasses. Such prior art devices have usually been manufactured of metal and were relatively expensive. Further, even those prior art articles which were manufactured of plastic were either unitary in which case the plastic forming operation was expensive, or were multi-part and required time-consuming assembling steps as by gluing or fastening. Further in such prior art holders, it was possible for the condensation forming on the outside of the can or other container to drip from the holder.

SUMMARY

These objections are overcome with this invention which provides for a handle attaching holder for use in connection with standard size beverage containers, such as, for example, the 12-fluid ounce cans in which soft drinks are dispensed. The holder of this invention comprises three pieces; a coaster-like base member, a curved handle member and a segmental-circular gripping member.

The base member has a frusto-conically shaped exterior wall and a circular central well. The bottom of the central well has concentric condensate trapping raised rings therein and circumferentially spaced raised rests. A handle securing base projects from a point on the exterior of the base member and contains therein a recess of rectangular cross-section open at the top. The handle member is curved and has at the bottom thereof an extending four-sided projection adapted to be press-fitted into the rectangular recess in the base member. The upper end of the curved handle member terminates in a T-shaped tongue, while the segmental-circular holding member has a corresponding T-shaped groove in the mid-point of the member. The T-shaped groove is thus adapted to receive the T-shaped projecting tongue on the end of the handle member in press-fit relation.

The segmental-circular holding member is made of a plastic which is sufficiently resilient to allow a can to be pressed therein, followed by a contraction of the member to thereby grip the can in a pincer-like grip. The member is sized to snugly engage and hold a standard cylindrical beverage can.

BRIEF DESCRIPTION OF THE DRAWINGS

FIGURE 1 is a top plan view of the can holder of this invention;

FIGURE 2 is a side elevational view of the can holder illustrating by broken lines a can held therein;

FIGURE 3 is a front elevational view of the can holder with the base member in cross-section;

FIGURE 4 is an exploded rear elevational view of the can holder illustrating the three separate parts thereof.

DESCRIPTION OF THE PREFERRED EMBODIMENT

As is shown in FIGURE 1 a can holder 10 of this invention consists of a base member 11, a handle member 12 and a segmental-circular holding member 13. The base member 11 has a frusto-conical exterior surface 14 and an interior right-cylindrical well 15. The well 15 has a bottom 16 which has thereon a plurality of raised concentric rings 17.

Circumferentially spaced equidistatly around the bottom 16 are four raised seats on rests 18. The rests 18 extend from near the wall 19 of the well 15 radially inwardly past the first or outermost of the rings 17. The rests 18 are raised from the bottom 16 to a height greater than the upper surfaces of the rings 17.

As it is best shown in FIGURE 3, the base member 11 has an outside or bottommost surface 20 which is above the bottommost annular surface 21 of the frusto-conical exterior wall 14 of the base member 11. In this manner the under surface of the bottom 20 is prevented from coming into direct contact with the surface of a table or other support on which the holder might be placed to rest.

The diameter of the well 15 is just slightly greater than the exterior diameter of the bottom of a standard size beverage can when provided with a bead, as shown. In this manner when a can is fitted into the well 15, as is illustrated by the broken lines in FIGURE 2, a minimal-spaced annular gap 23 is provided between the wall 19 of the well 15 and the cylindrical side wall 24 of the can 25. In this manner, condensation forming on the exterior surface of a chilled can is allowed to run down the side of the can into the bottom of hte well 15. Because the bottom of the can 25 rests on the tops of the rests 18 it is held above the top surfaces of the concentric rings 17. The condensate accordingly, can form a pool in the bottom of the well 15. The rings 17 act as a series of retaining walls to prevent the pool of condensate from sloshsing out of the bottom of the well when the base member is tipped as for instance when drinking or pouring from a can held by the holder. Further, because the annular space 23 between the wall 19 of the well 15 and the side 24 of the can 25 is minimal, although condensate can drip into the bottom of the well, the space 23 will not allow any appreciable amount of condensate to drip out when the base member 11 is tilted.

The can is gripped around its upper half by the holding member 13. The member 13 is segmental-circular and has a projection 27 extending radially outwardly from the mid-point of the gripping section 28. Reinforcing vanes 29 extend from the axially mid-portion of the outside surfaces 30 of the section 28 and terminate in the projection 27. The vanes 29 add to the strength of the gripping member. The vanes are arcuately curved and act in the manner of a buttress.

A curvature of the member 30 is sized to allow it to surround slightly more than half of the circumference of a standard size beverage can so that when contracted, it engages the can in tight gripping relationship. The member 13 is constructed of a plastic having sufficient resiliency to allow the gripping section 28 to expand a sufficient amount to receive a can pressed thereinto. The plastic is, however, rigid enough so that the section 28 will snap back into gripping relationship with the can after the can has been pressed into it to the extent that a major portion of the cylindrical surface of the can lies within the ends of the gripping member 30. In this manner the member 13 acts as a pincer for receiving and retaining a can in the holder.

The handle member 12 acts as the sole connecting and supporting link between the base member 11 and the gripping member 13. The handle member 12 is curved and has an upper end 33 which when in its associated relationship, terminates radially inwardly toward the projected axis of the bottom member 11. The bottom end 34 of the handle member 12 then projects generally parallel to said axis.

As best shown in FIGURE 1 the projection 27 of the gripping member 13 terminates in a T-shaped groove 35. A T-shaped tongue 36 on the upper end 33 of the handle member is adapted to fit snugly into said T-shaped groove 35. The size relationship between the tongue 36 and the groove 35 is such as to allow a press-fit, whereby the member 13 is retained on the upper end of the member 12 without the necessity of gluing, or the like. As shown in FIGURE 4, the bottom member 11 has a generally rectangularly shaped base 37 which projects from the exterior frusto-conical face 14 of the bottom member. The base 37 has a flat upper face 38, and an open well or recess 39 of rectangular cross-section which extends into the base 37. The rectangular projection 40 depends from the bottom 34 of the handle member 12 that is sized to fit into the recess 39 in a press-fit relationship, thereby securing the base member 11 to the handle member 12. Because both the projection 40 and the recess 39 are of rectangularly cross-section the handle member 12 is prevented from turning relative to the base member 11.

It it to be understood that the relationship between the T-shaped tongue 36 and the T-shaped groove 35 and the rectangular projections 40 and the rectangular recess 39 are such that a press-fit or interference-fit relationship exists between these connecting members when the can holder is assembled. This allows assembly into a finished product without the use of glue, plastic dissolving solvents or other fastening means. It is further to be understood that the use of the T-shaped groove and tongue and the rectangular projection and recess prevent relative misalignment between the base member 11 and the gripping member 13.

In its assembled state the axis of the gripping member 13 can be the same as the axis of the bottom member 11. However, in order to increase the holding ability of the member 13, their axes may be non-coincident, but with the axis of the member 13 lying radially outwardly from the axis of the base member 11 in a direction away from the handle member 12. In this manner when the can is fitted into the holder, the handle member will be resiliently sprung back a small amount until the axes of the members 11 and 13 are concentric. If the handle member 12 is made of a rigid but resilient plastic the same as the gripping member 30, the spring pressure of the handle against the member 13 will increase the gripping ability of the member 13 around the can 25.

The can holder is preferably made of a synthetic plastic material of high thermal plasticity, such as high impact polystyrene, or the like, with each of its component parts, the base, handle, and gripping members separately molded to close tolerance, so that when assembled, the holder appears to be integral and can be disassembled only with the exertion of considerable manual force. There is thus no danger of the can holder coming apart accidentally.

From the above it can be seen that my invention provides for a novel can holder sized to grip and provide a handle for a standard size beverage can.

I claim as my invention:

1. A can holder for a standard size beverage can, which comprises: a base member having a frusto-conical exterior surface and a right-cylindrical well, said well being sized to receive the bottom of a standard size beverage can while providing a narrow annular gap between the inner wall of the well and the outer surface of the can, a base extending radially outwardly from the base member, said base having an open recess therein of rectangular cross-section, a curved handle member having top and bottom free end surfaces at right angles to each other, said bottom free end surface having a rectangular projection depending therefrom and sized to be received in the said rectangular recess in press-fit relationship therewith, said upper end terminating in a T-shaped tongue, a gripping member having a segmental-circular portion of greater than semi-circular extent, a portion projecting radially ouwardly from the mid-point of the said segmental-circular portion and terminating in a T-shaped groove sized to receive said T-shaped tongue in press-fit relationship therewith, said segmental-circular portion being of sufficient resiliency to allow the free ends of said segmental-circular portion to spread apart sufficiently to receive a can having an exterior diameter equal to the interior diameter of said segmental-circular portion and to spring back after receiving said can to grippingly engage said can.

2. A can holder as defined by claim 1, wherein said base member, handle member and gripping member are all formed of a synthetic plastic material of high thermal stability.

3. A can holder as defined by claim 2, wherein said well has radially and circularly extending raised rests with surfaces for supporting a can above the bottom of said well.

References Cited

UNITED STATES PATENTS

| | | | |
|---|---|---|---|
| 1,001,628 | 8/1911 | Erichsen | 248—145.6 |
| 1,263,452 | 4/1918 | Meadow | 248—145.6 |
| 2,088,387 | 7/1937 | Rice et al. | 248—145.6 |
| 2,784,578 | 3/1957 | Southwick. | |
| 2,979,225 | 4/1961 | Noffsinger. | |
| 3,029,975 | 4/1962 | Aiello. | |
| 3,074,678 | 1/1963 | Mele | 248—145.6 |

FRANCIS K. ZUGEL, Primary Examiner

U.S. Cl. X.R.

215—100; 220—85